United States Patent
Paddock et al.

(10) Patent No.: US 9,532,583 B2
(45) Date of Patent: Jan. 3, 2017

(54) BROWN BUTTER AND SYSTEMS AND METHODS FOR THE CONTINUOUS PRODUCTION THEREOF

(71) Applicant: Land O'Lakes, Inc., Arden Hills, MN (US)

(72) Inventors: Jill Paddock, Maplewood, MN (US); Nicole Igielski, Oakdale, MN (US); Thomas Aurand, Woodbury, MN (US); Richard Dinesen, Woodbury, MN (US)

(73) Assignee: LAND O'LAKES, INC., Arden Hills, MN (US)

( * ) Notice: Subject to any disclaimer, the term of this patent is extended or adjusted under 35 U.S.C. 154(b) by 357 days.

(21) Appl. No.: 13/650,756

(22) Filed: Oct. 12, 2012

(65) Prior Publication Data
US 2014/0106054 A1   Apr. 17, 2014

(51) Int. Cl.
| | | |
|---|---|---|
| *A23C 1/12* | (2006.01) | |
| *A23C 15/02* | (2006.01) | |
| *A23C 15/12* | (2006.01) | |
| *A23C 15/14* | (2006.01) | |
| *A23D 7/005* | (2006.01) | |

(52) U.S. Cl.
CPC .............. *A23C 1/12* (2013.01); *A23C 15/02* (2013.01); *A23C 15/12* (2013.01); *A23C 15/14* (2013.01); *A23D 7/0053* (2013.01)

(58) Field of Classification Search
CPC ......... A23C 15/14; A23C 15/02; A23C 15/12; A23C 1/12; A23C 15/00
USPC ....................................................... 426/581
See application file for complete search history.

(56) References Cited

U.S. PATENT DOCUMENTS

| | | |
|---|---|---|
| 6,793,955 B1 | 9/2004 | Landon |
| 7,927,646 B2 | 4/2011 | Landon |
| 2010/0080884 A1 | 4/2010 | Landon |

(Continued)

FOREIGN PATENT DOCUMENTS

| | | |
|---|---|---|
| GB | 1240865 A | 7/1971 |
| JP | S5668370 A | 6/1981 |

(Continued)

OTHER PUBLICATIONS

Huyghebaert, A et al., "Comparison of the antioxidative activity of Maiflard and caramelisatian reaction products", Database FSTA [online] International Food Information Services (IFIS), Frankfurt-Main, DE [database accession No. FS-1983-O6-A-0364]. XP-002719129, 1983, pp. 409-415.

(Continued)

*Primary Examiner* — Jeffrey Mornhinweg
(74) *Attorney, Agent, or Firm* — Dorsey & Whitney LLP; Bridget M. Hayden, Esq.

(57) ABSTRACT

A system and method for the continuous production of brown butter involves concentrating butter while retaining solids non-fat in the butter, and continuously transferring and heating the concentrated butter to cause the solids non-fat in the butter to react in a maillard reaction to form a brown butter product. The system may use one or more of a heating vessel, an evaporator and a reaction vessel to form the brown butter in the continuous process. A brown butter product derived from butter includes reacted solids non-fat particulates from a maillard reaction suspended by nascent fat crystals nucleated about the reacted solids non-fat particulates and by large fat crystal structures joined to the nascent fat crystals.

8 Claims, 1 Drawing Sheet

(56) References Cited

U.S. PATENT DOCUMENTS

| | | |
|---|---|---|
| 2010/0092646 A1 | 4/2010 | Krauss |
| 2010/0196534 A1 | 8/2010 | Illingworth et al. |
| 2012/0189752 A1 | 7/2012 | Illingworth et al. |

FOREIGN PATENT DOCUMENTS

| | | |
|---|---|---|
| JP | 2002/306062 A | 10/2002 |
| JP | 2011/109960 A | 6/2011 |

OTHER PUBLICATIONS

International Search Report and Written Opinion, Application No. PCT/US2013/064288, Filed Oct. 10, 2013, Issued Feb. 24, 2014, 11 pages.
"Brown Butter Bounty", http://www.ideasinfood.typepad.com, 2008.
Peterson, James, "Sauces: Classical and Contemporary Sauce Making", 1991, pp. 389 and 390.
Smith, S.W., "What is Brown Butter?", http://www.wisegeek.com, 2003.
Rosso, Julee and Sheila Lukins, "The New Basics Cookbook", 1989, pp. 778.
"Browned Butter", http://www.landolakes.com, 2003.
"How to Brown Butter", http://www.chow.com, 2006.
"Brown Butter—Glossary Term", http://www.recipetips.com, 1999.

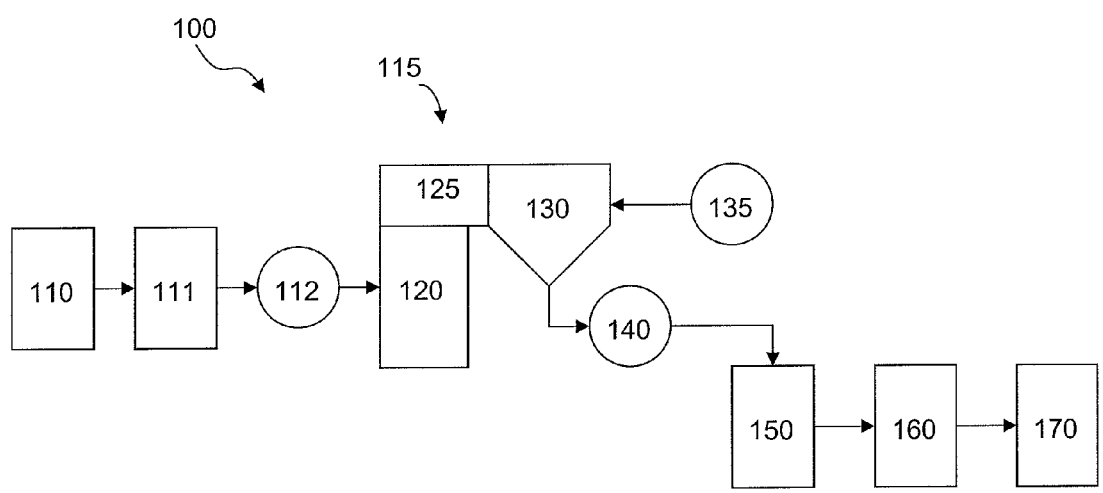

BROWN BUTTER AND SYSTEMS AND METHODS FOR THE CONTINUOUS PRODUCTION THEREOF

FIELD OF THE INVENTION

The present disclosure relates to brown butter compositions and systems and methods for the continuous production of brown butter.

BACKGROUND

Butter preparation methods represent some of the oldest techniques for utilizing fat components that are found in milk. Butter manufacture has been accomplished in one form or another for over 4500 years. Butter production techniques generally evolved from an individual farm activity to a factory-based technique with the introduction of milk pooling systems for creamery operation in the 1870s. Later advances in fat quantification techniques, pasteurization, refrigeration, and bacterial culture usage further advanced the art of butter production. Advances in butter production technology helped make butter a staple item in the kitchen. Certain components of butter, such as protein and lactose, give desirable browning characteristics to baked goods.

In some cases, butter may be used to produce brown butter in the kitchen by slowly melting whole butter in a saucepan over heat to cook off water and to brown the remaining milk solids in the reduced butter. Brown butter typically has a nutty flavor and aroma and is brown in color. However, making brown butter in a saucepan is difficult because the solids can burn during the browning process due to the browning reaction increasing in intensity to cause scorching, which gives the butter negative organoleptic qualities such as a charred taste and a black appearance. Cookbooks commonly warn chefs to continuously watch the butter in the saucepan and immediately remove the butter from heat, but nonetheless, even skilled chefs commonly burn butter when attempting the browning process.

SUMMARY

In view of the foregoing, provided herein are brown butter products, systems and methods for making brown butter products from butter and other dairy-based products.

According to certain implementations, a method of forming a brown butter product, includes heating a starting composition containing fat, protein, sugar and a starting moisture content under vacuum pressure in a first environment, which causes a portion of the moisture to vaporize while retaining the fat, protein and sugar to form a concentrated composition. The concentrated composition includes a reduced moisture content relative to the starting moisture content and a moisture variation that ranges up to about 3 percent. The concentrated composition is continuously transferred to a second environment and heated to cause the protein and the sugar in the concentrated composition to react in a maillard reaction to form the brown butter product with reacted solids non-fat particulates.

In other implementations, a system for the continuous production of brown butter includes a heating vessel adapted to heat a starting composition containing fat, protein, sugar and a starting moisture content. An evaporator device continuously receives the heated starting composition and forms a concentrated composition by causing a portion of the moisture in the starting material to vaporize while retaining the fat, protein and sugar. The concentrated composition includes a reduced moisture content relative to the starting moisture content and a controlled moisture content within a range of about 3 percent. A reaction vessel is adapted to continuously receive the concentrated butter and causes the concentrated butter to react in a maillard reaction to produce a brown butter product with reacted solids non-fat particulates.

In yet another implementation, a brown butter product derived from butter includes reacted solids non-fat particulates from a maillard reaction suspended by nascent fat crystals nucleated about the reacted solids non-fat particulates and by large fat crystal structures joined to the nascent fat crystals.

BRIEF DESCRIPTION OF THE DRAWING

FIG. 1 illustrates a processing system that may be used in forming brown butter according to certain implementations.

DETAILED DESCRIPTION

Brown butter products provided herein may be used in applications such as the preparation of frostings, in baking items and cooking. The brown butter products provided herein may be formed from a starting composition such as butter containing about 80 percent fat, cream, and optionally salt, or other dairy-based compositions containing fats, proteins and sugars, without receiving intermediate compositions during the production process. Processes of forming the brown butter products from the starting composition are in contrast to processes of forming brown butter that involve combining multiple compositions, such as lipids, aqueous solutions, powdered butterfat and milk powder at various stages of the brown butter production process.

As provided above, the starting compositions may include a number of dairy-based products containing moisture, fat and protein. The term "butter" may be used in accordance with labeling requirements of regulatory authorities in the United States, such as the United States Department of Agriculture (U.S.D.A.), in which butter has a particularized definition in that it is made exclusively from milk and/or cream and may each contain additional coloring matter and salt. In addition, under the U.S.D.A. regulations, butter may not contain less than 80 weight percent milkfat (also referred to as butterfat). In addition to containing about 80 weight percent milkfat (e.g., from about 80 to 85 weight percent or from about 80 to 81 weight percent), the butter derived from cream or milk contains about 1 to 5 or about 3 to 5 percent solids non-fat (e.g., protein, lactose, salt and combinations thereof), a total solids content of between 83 to about 85 percent, and about 14 to 18 percent or preferably about 15 to 17 percent moisture. Alternatively, butter containing about 70 to about 90 percent fat and up to about 27 percent moisture and the balance solids may be provided as a starting composition.

Implementations of forming brown butter from the above starting compositions may be practiced using the processing system 100 depicted by the schematic of FIG. 1. The processing system 100 may include a heating vessel 110, a pre-heating vessel 111, a first transfer pump 112, an evaporator device 115 including a heat exchanger 120, a vapor dome 125 with a separator device 130, a vacuum pump 135, a second transfer pump 140, a reaction vessel 150, one or more cooling vessels 160 and a packaging and storage system 170. The processing system 100 may allow for the continuous production of brown butter products.

In the processing system 100, butter or another dairy-based product may be provided as the starting composition and be melted or simply heated to a temperature of about 120° F. to about 140° F. in the heating vessel 110. The heated, liquefied starting composition may optionally be transferred and further heated using a pre-heating vessel 111, which may heat the liquefied starting composition to a temperature of about 160° F. or up to about 212° F. Alternatively, the heating vessel 110 may heat the liquefied starting composition up to these elevated temperatures. When the starting composition reaches a temperature of about 212° F., the starting composition may begin to concentrate such as through boiling. The introduction of the starting composition in the heating vessel 110, the pre-heating vessel 111 or both, may be provided continuously or periodically without interrupting the production of starting composition in the processing system 100, described further below.

The heating vessel 110 may be configured with an open top and may be provided as a kettle or a jacketed tank where water or steam may be circulated around the vessel holding the starting composition for gradual heating. The pre-heating vessel 111 may be a heat exchanger such as a plate heat exchanger and may be adapted to receive liquefied starting composition from the heating vessel 110 and provide further heating.

The heated starting composition having a temperature of between about 130° F. to about 165° F., or up to about 212° F., and a variable moisture content is transferred to the evaporator device 115 using a first transfer pump 112. The first transfer pump 112 may be configured as a positive pump, may operate continuously and may transfer the heated starting composition at a controlled rate.

The evaporator device 115 may include a heat exchanger 120, a vapor dome 125 and a separator device 130. The heat exchanger 120 is joined to the separator device 130 by way of the vapor dome 125, and the vacuum pump 135 may be adapted to exert a slight vacuum and reduce the pressure in the evaporator device 115. For example, the vacuum pump 135 may (pressurize) the evaporator device 115 to about −19 inHg to −26 inHg or to about −23 inHg to −25 inHg. The vacuum pressure within the evaporator device 115 may help pull moisture from and facilitate heating of the starting composition.

In the evaporator device 115, the heated starting composition enters the heat exchanger 120 from the first transfer pump 112. While entering the heat exchanger 120, the heated starting composition may be processed by further heating under agitation and stirring to cause boiling and initiate concentrating of the starting composition. As the level of the concentrating starting composition in the heat exchanger 120 rises, the concentrating composition enters the vapor dome 125 of the evaporator device 115, which may be provided as an upper chamber of the evaporator device 115.

The heat exchanger 120 may be configured as a scraped surface heat exchanger and may be formed as a lower chamber of the pressurized evaporator device 115. In this example, the evaporator device 115 may be a scraped surface evaporator device. The evaporator device 115 contents may be heated and agitated under vacuum pressure as heating media such as steam or hot water flows between a heat transfer wall and an insulated jacket. Mechanical agitation may be provided by revolving blades that provide conduction and convection conditions for transferring heat. In some implementations, processing may be facilitated by centrifugal action through rotation of revolving blades and rotors in the heat exchanger 120. During such processing, the starting composition concentrates as its moisture is caused to evaporate or flash off.

In alternative implementations, the heat exchanger 120 may be configured as a thin film evaporator or a plate evaporator adapted to cause the moisture in the starting composition to evaporate. For example, the heat exchanger 120 configured as a thin film evaporator may be adapted to heat the starting composition in thermal sections of the evaporator, while rotating blades spread the starting composition over the heated surfaces of the thermal sections. This may cause film turbulence in the starting composition resulting in high heat transfer rapid vaporization of the moisture in the starting composition. In this example, the thin film evaporator may be designed to allow the starting composition to flow by gravity through the thin film evaporator configured as an upper chamber and a concentrated composition may flow to a lower chamber and exit into one or more of the vapor dome 125 and separator device 130 adapted to remove the moisture in the form of vapor (e.g., water vapor), described further below.

In further implementations, the heat exchanger 120 may be provided as multiple heat exchangers adapted to drive off moisture within starting composition. For example, multiple heat exchangers may be connected in series, which may be useful for starting compositions having a higher moisture content. In this example, one heat exchanger may be adapted to receive the starting composition from an upstream device, such as the transfer pump 112, heat the starting composition to initiate concentrating and deliver the concentrating starting composition to another heat exchanger. The additional heat exchanger may be adapted to further heat and concentrate the received composition and either deliver the composition to the vapor dome 125 or to another heat exchanger for further processing.

Turning to the vapor dome 125 of the evaporator device 115, the concentrating starting composition from the heat exchanger 120 continues to concentrate upon entering the vapor dome 125 and the moisture vapors separate therefrom. Movement of the concentrating starting composition into the vapor dome 125 may be due to the starting composition being mechanically conveyed through the heat exchanger 120 (e.g., through centripetal force or a mechanical scraper, wiper, agitator or the like) and may be facilitated by the vacuum pressure. Movement of the moisture from the concentrating starting composition to form a concentrated composition may be facilitated through vacuum pressure, through convection, or both. The vapor dome 125 defines an area that enables the vaporized moisture to rise above and separate from the concentrated fats (e.g., butter oil, concentrated butter or ghee) and solids in the concentrated composition. In some implementations, the vapor dome 125 may form an upper chamber of the evaporator device 115, for example, when a lower chamber defines the heat exchanger 120.

A separator device 130 may be coupled to an outlet of the vapor dome 125 and may receive the concentrated composition and the separated moisture vapors. The concentrated composition may flow by gravity from the vapor dome 125 into the separator device 130, while the moisture vapors and any volatile components entering the separator device 130 from the vapor dome 125 may be vented from the separator device 130 and caused to exit the processing system 100. In some implementations, the moisture vapors may be cooled and condensed while exiting the processing system 100. In the separator device 130, the final moisture content of the concentrated composition may be controlled within a variation range of from about 1 to about 3 percent, and the moisture content within the concentrated composition may be reduced relative to the moisture content of the starting composition.

The separator device 130 may be configured as a vessel that enables the concentrated composition to flow by gravity to an outlet of the separator device 130 coupled to the positive pump 140. In addition, the separator device 130 may be configured to enable the moisture to be vented without disrupting the flow of the concentrated composition towards the outlet. In some implementations, the separator device inlet 130 joined to the outlet of the vapor dome 125 may define an opening that enables the concentrated composition and the moisture vapors to simultaneously enter the separator device 130 from the vapor dome 125.

It has been discovered that concentrating the butter in the evaporator device 115 provides a more thorough concentration of the milkfat and solids non-fat and better removal of moisture from the starting composition compared to batch processing. For example, the range variation of the moisture content of the concentrated composition may be controlled at about 3 percent, a variation of about 1 to about 3 percent or a variation of about 1 to 2 percent upon reaching the separator device 130. Using butter as an example starting composition, the total moisture content of concentrated butter within the separator device 130 may be up to about 6 percent with a moisture content within a controlled range with a variation of about 1 percent (e.g., a variation of about 0.25 to 1.25 percent moisture), a variation of about 2 percent (e.g., a variation of about 0.5 to 2.5 percent moisture) or a variation of about 3 percent (e.g., a variation of about 1 to 4 percent moisture), with the balance of the concentrated butter formed of solids such as milkfat (e.g., about 93 to about 95 percent) and solids non-fat such as protein and/or lactose (e.g., at about 4 to 6 percent). This controlled separation of moisture and volatiles ensures that only compositions having a desired moisture content and ingredient profile are used for further processing in the formation of the brown butter products.

By separating the starting composition from the concentrated composition in the evaporator device 115, the higher moisture content starting composition may periodically or continuously be transferred into the heat exchanger 120 of the evaporator device 115, without disrupting the flow of the concentrated composition into and out of the separator device 130. This facilitates a continuous process of preparing the composition for browning.

Further, by continuously moving the starting composition and the concentrated composition within the evaporator device 115, such as by the continuous flow of the starting composition into the device, by agitating and scraping using blades and rotors in the heat exchanger 120 and causing the concentrated composition to continuously flow through the separator device 130 by gravity flow, the concentrating starting composition and concentrated composition is prevented from depositing on the walls of the device and from subsequently charring.

In some implementations, the solids non-fat (e.g., proteins and sugars) in the composition may begin to partially brown in a maillard reaction in the vapor dome 125 or in the separator device 130 of the evaporator device 115, which may occur upon the concentrated composition reaching a temperature of about 285° F. to 315° F.

Turning to the transfer pump and the reaction vessel 150, the concentrated composition within the separator device 130 may flow to the reaction vessel 150 via a second transfer pump 140, which may be configured as a positive pump. The second transfer pump 140 may operate continuously and provide the concentrated composition to the reaction vessel 150 at a controlled rate. The concentrated composition may have a temperature of between about 145° F. to about 230° F. at the second transfer pump 140.

The reaction vessel 150 may be configured as a scraped surface heat exchanger and may be adapted to heat the concentrated composition up to a reaction temperature of about 285° F. to about 315° F., or from about 295° F. to about 300° F., to form a reacted composition, in which the concentrated solids (e.g., protein and sugars) in the composition are fried within oil to cause a maillard reaction. This can be done with or without back pressure on the composition in the reaction vessel 150. The reacted composition thereby forms a brown butter product with reacted solids-nonfat particulates and a moisture content that is substantially the same as the moisture content of the concentrated composition.

In some implementations, a temperature differential in the reaction vessel 150 between its walls and center may be relatively low to enable the maillard reaction to occur throughout the reaction vessel 150. However, in some implementations, a substantial portion of the maillard reaction may occur on the surface of the walls of the reaction vessel 150 where the temperature differential is the highest.

In some implementations, where the concentrated solids non-fat have partially undergone a maillard reaction in the vapor dome 125 or the separator device 130 of the evaporator device 115, the concentrated solids non-fat may further undergo a maillard reaction to form the reacted solids-nonfat particulates in the reaction vessel 150.

By the reaction vessel 150 receiving only the concentrated composition with a narrow moisture range from the separator device 130, this ensures that the maillard reaction of the solids non-fat only occurs within compositions having the desired fat (e.g., milkfat), solids non-fat (e.g., protein and sugars) and moisture content range. It has been discovered that due to the narrow variation in the moisture range within the concentrated composition, the reaction vessel 150 may be operated under conditions (e.g., temperatures, pressures and flow rates) that are optimal for the proteins and the sugars to undergo the maillard reaction. This also enables the brown butter product to be formed in a controlled, continuous process.

After forming the brown butter product in the reaction vessel 150, the brown butter product is transferred to a cooling vessel 160 such as a scraped surface heat exchanger providing a controlled cooling environment where the product may initially be rapidly cooled from reaction temperatures and then gradually cooled. Rapid cooling may initiate the formation of nascent fat crystals that nucleate at the surface of the reacted solids-nonfat particulates. The brown butter product may be further and/or gradually cooled to promote formation of large fat crystals that join to and surround the smaller nascent fat crystals. For example, gradual cooling to promote large fat crystal growth may be to a temperature of about 100° F. to 50° F., or from about 80° F. to about 50° F. Cooling the brown butter product, which may be in the presence of agitation, suspends the reacted solids non-fat particulates through the crystal formation step while maintaining the product in a flowable or pumpable state.

In some implementations, the brown butter product may be cooled by the cooling vessel 160 to between about 70° F. and about 80° F., for example, for subsequent packaging in a tub. In other implementations, the brown butter product may be cooled to temperatures between about 50° F. to about 60° F., for example, for subsequent stick or print production.

In this example, the system 100 may include a pin mixer connected to or integrated with the cooling vessel 160.

In further implementations, cooling vessels may be connected in series to enable a multiple-step cooling processes. For example, one cooling vessel may receive the reacted butter product and cool the product to about 100° F., and a second cooling vessel may receive the product at about 100° F. and further cool to between about 80° F. and about 50° F.

Cooling the brown butter product using one or more cooling vessels 160 may yield a plastic brown butter product having the desired flavor and texture of brown butter.

In some implementations, following the brown butter product formation in the reaction vessel 150 (using any of the dairy-based starting compositions), or following cooling in the cooling vessel 160, the brown butter product may be combined with bulking agents, water, cream, buttermilk, other foodstuffs and so on, in order to provide an array of products containing brown butter. Prior to the solids non-fat in the concentrated composition undergoing a maillard reaction in the reaction vessel 150 to form the brown butter product however, the starting composition in its various processing states, up to the reacted composition, may be the sole ingredient in the processing system 100. Further, as the starting composition is processed through the processing system 100, the solids non-fat may be retained with the oil, thereby enabling the solids non-fat to undergo the maillard reaction within the oil.

After cooling in the cooling vessel 160, the brown butter product may be transferred to a packaging and storage system 170, which may be configured using conventional packaging, transfer and storage equipment. In some implementations, after cooling, and prior to packaging, the brown butter product may be texturized in a texturizer, such as a pin mixer. In addition, nitrogen gas may also be introduced into the brown butter product to produce a finer, smoother product.

In system 100, some or all of the devices may be connected in series. For example, each of the devices in the processing system 100 may be outfitted with one or more conduits, pumps, valves, and so on, that provide a physical connection to an adjacent upstream and downstream device and enables the transfer of contents (e.g., butter in the various phases described above, moisture and non-condensable gasses) between the devices or out of the system. By connecting the devices in the processing system 100, this may enable the starting composition to be transferred through the processing system 100 without interruption and without addition of additional components to the composition during the continuous formation of the brown butter product in a single pass through the system 100 without re-circulating the brown butter product back through system 100. One or more components of the system 100 may be closed devices, which may enable the butter in its various phases to be subject to elevated temperatures and pressures within individually controlled environments in order to gradually cause the butter to concentrate and to react to form the brown butter product. In addition, effluents from devices in the processing system 100 may serve as influents for a downstream device. For example, the effluent of concentrated butter from the separator device 130 may serve as an influent for the reaction vessel 150. However, as may be appreciated in view of the foregoing, the influent starting composition entering the heat exchanger 120 of the evaporator device 115 may be transformed through evaporation into a concentrated composition and serve as the effluent from the evaporator device 115.

Further, one or more devices in the processing system 100 may optionally be removed or alternatively may be duplicated and provided in parallel or in series. For example, the heating vessel 110 may optionally be removed or replaced in favor of the pre-heating vessel 111. In another example, the cooling vessels 160 may be duplicated and used in parallel or in series to cool the brown butter product.

Brown butter products that are derived solely from butter, are dairy products that may be labeled with the sole ingredient as "butter" and may be considered a butter-based product. For example, the brown butter product formed from 80 percent milkfat butter as the starting composition may have a final composition of between 94 to 99 percent total solids, more preferably between 97 to 99 percent total solids, and most preferably between 98 to 99 percent total solids, with between about 1 to 6 percent moisture, more preferably between about 1 to 3 percent moisture, and most preferably between about 1 to 2 percent moisture and with a controlled range of moisture within about 1 percent, 2 percent or about 3 percent.

It has been found that brown butter products produced using the methods and systems provided herein result in reacted solids non-fat particles being finely dispersed and suspended through the brown butter product, and have a particle size that give the product a desirable texture, smoother mouthfeel, along with a nutty flavor and aroma. Table 1 below illustrates the differences in particle size distribution between stove top-made (e.g., scratch) brown butter and brown butter produced according to three test runs following the processes provided herein.

TABLE 1

| Sample | Median Value (um) | Surface area (m²/cc) | 10th Percentile (um) | 50th Percentile (um) | 90th Percentile (um) |
|---|---|---|---|---|---|
| Stove top-made | 154 | 0.09 | 35.1 | 141 | 286 |
| Test Run 1 | 73.3 | 0.15 | 19.8 | 64.9 | 137 |
| Test Run 2 | 57.7 | 0.16 | 19.6 | 54.1 | 99.4 |
| Test Run 3 | 41.4 | 0.25 | 13 | 37.6 | 72.9 |

With reference to Table 1, the particle size distribution decreased significantly for test runs 1-3 compared to the stove top-made sample. The particle sizes produced during the test runs have approximately one-third the size compared to the reacted solids non-fat particulates produced using the stove top-made sample. The smaller particulate sizes result in a significant increase in surface area of the reacted solids non-fat particulates compared to that provided by the stove top-made particulates. With a larger surface area available, more reaction area is provided for nucleation of nascent fat crystals on the reacted solids non-fat particulates. Further, because the brown butter product may be both rapidly and gradually cooled, nascent fat crystals may nucleate about the reacted solids non-fat particulates and larger fat crystals may adhere to the nascent fat crystals in order to suspend the reacted solids non-fat particulates in the brown butter product. This is in contrast to stove top-made brown butter, which rapidly cools in an uncontrolled environment from maillard reaction temperatures to room temperatures or to refrigeration temperatures, and as a result, solids non-fat particulates do not suspend evenly within the brown butter and tend to settle to the bottom of the stove top-made product.

In some implementations, a variation of course and fine particulates may provide the brown butter with a desirable flavor, texture and appearance; and in some instances, larger particulates may be desirable due to their resemblance in appearance to stove top-made brown butter. However, the reacted solids non-fat particulates having various sizes may be suspended in the brown butter product using the above-described methods.

Although the present disclosure provides references to preferred embodiments, persons skilled in the art will recognize that changes may be made in form and detail without departing from the spirit and scope of the invention.

What is claimed is:

1. A method for the continuous production of a brown butter product, comprising:

heating a starting composition comprised of butter containing fat, protein, sugar and a starting moisture content under vacuum pressure in a first environment to cause a portion of the moisture to vaporize, thereby forming a moisture vapor and a concentrating composition comprised of fat, protein and sugar, the concentrating composition having a reduced moisture content relative to the starting moisture content;

continuously transferring the concentrating composition and the moisture vapor to a second environment and separating the concentrating composition from the moisture vapor to form a concentrated composition such that a moisture variation within the concentrated composition ranges up to about 3 percent before exiting the second environment; and continuously transferring the concentrated composition to a third environment and heating the concentrated composition to cause the protein and the sugar in the concentrated composition to react in a Maillard reaction to form the brown butter product with reacted solids non-fat particulates, wherein the concentrated composition is heated to a temperature of about 285° F. to about 315° F. to cause the Maillard reaction, wherein the brown butter product is formed continuously in the third environment, and wherein the concentrated composition and the brown butter product include a moisture content of about 1 to about 6 percent.

2. The method of claim 1, wherein a moisture content of the concentrated composition is about the same as the brown butter product.

3. The method of claim 1, wherein the brown butter product is derived solely from butter.

4. The method of claim 1, further comprising suspending the reacted solids non-fat particulates in the brown butter product.

5. The method of claim 4, wherein the reacted solids non-fat particulates are suspended by cooling the brown butter product from a reaction temperature at which the composition reacts in the Maillard reaction to about 50° F. to about 80° F.

6. The method of claim 1, wherein prior to concentrating, the starting composition includes from about 81 to about 85 percent total solids, and wherein the brown butter product includes from about 94 to about 99 percent total solids.

7. The method of claim 1, wherein the brown butter product includes from about 94 to about 99 percent total solids.

8. The method of claim 1, wherein the concentrated composition has the same fat, protein and sugar as the starting composition.

* * * * *